(12) United States Patent
Cramer et al.

(10) Patent No.: US 7,768,799 B2
(45) Date of Patent: Aug. 3, 2010

(54) APPARATUS FOR ACCOMODATING A PLURALITY OF INDIVIDUAL INVERTERS

(75) Inventors: Gunther Cramer, Kassel (DE); Bernd Engel, Wolfenbuttel (DE)

(73) Assignee: SMA Solar Technology AG, Niestetal (DE)

( * ) Notice: Subject to any disclaimer, the term of this patent is extended or adjusted under 35 U.S.C. 154(b) by 799 days.

(21) Appl. No.: 11/701,644

(22) Filed: Feb. 2, 2007

(65) Prior Publication Data

US 2007/0297206 A1    Dec. 27, 2007

(30) Foreign Application Priority Data

Jun. 22, 2006    (DE)    .................... 20 2006 009 906 U

(51) Int. Cl.
*H01R 9/00* (2006.01)
*H05K 7/14* (2006.01)

(52) U.S. Cl. .................. 361/823; 361/729; 361/731; 361/796

(58) Field of Classification Search ............. 361/822, 361/823, 825, 826, 829, 729, 731, 796, 809, 361/810; 307/6, 58
See application file for complete search history.

(56) References Cited

U.S. PATENT DOCUMENTS

| | | | | |
|---|---|---|---|---|
| 3,206,646 | A * | 9/1965 | Relation et al. | 361/714 |
| 4,519,657 | A | 5/1985 | Jensen | |
| 6,058,004 | A * | 5/2000 | Duva et al. | 361/301.4 |
| 6,317,348 | B1 * | 11/2001 | Vackar | 363/144 |
| 6,665,195 | B1 * | 12/2003 | Drabon et al. | 361/807 |
| 6,754,066 | B2 * | 6/2004 | Doan et al. | 361/600 |
| 7,382,624 | B2 * | 6/2008 | Barsun et al. | 361/730 |
| 7,443,052 | B2 * | 10/2008 | Wendt et al. | 307/44 |
| 7,667,963 | B2 * | 2/2010 | Illerhaus et al. | 361/690 |
| 2004/0139689 | A1 | 7/2004 | Sinha et al. | |

FOREIGN PATENT DOCUMENTS

| | | |
|---|---|---|
| FR | 2 727 805 A | 6/1996 |
| JP | 07194140 A | 7/1995 |
| JP | 2001 185875 A | 7/2001 |
| JP | 2001 284626 A | 10/2001 |

\* cited by examiner

*Primary Examiner*—Dameon E Levi
(74) *Attorney, Agent, or Firm*—Thomas R. Vigil

(57) ABSTRACT

The invention is directed to an apparatus (1) for accommodating a plurality of individual inverters (2), comprising a rack, the individual inverters (2) being removably mountable to the side elements of said rack, said rack having at least one terminal block (10) for receiving cables for current supply and evacuation.

13 Claims, 3 Drawing Sheets

APPARATUS FOR ACCOMODATING A PLURALITY OF INDIVIDUAL INVERTERS

FIELD OF THE INVENTION

The invention relates to an apparatus for accommodating a plurality of individual inverters.

DESCRIPTION OF THE PRIOR ART

In a high-capacity electric power generating plant such as a PV plant having a plurality of solar modules, there is either the possibility of utilizing one single high-capacity inverter or a plurality of individual inverters. In particular when using the Multi-String® technology, according to which individual inverters are associated with the various strings of photovoltaic modules of a PV plant, a plurality of smaller capacity inverters is provided. Hitherto, this plurality of inverters is being disposed in a decentralized manner on or in buildings; however, recently there is a desire from installers and also operators to have central plants.

BRIEF SUMMARY OF THE DESCRIPTION

The use of a plurality of small inverters instead of one large high-capacity inverter also has the advantage that, because of serial production, a plurality of small inverters is significantly less expensive than an accordingly large, high-capacity inverter. This also is a reason why the use of many small inverters is significantly preferred over one large high-capacity inverter.

In order for a plurality of inverters to be accommodated so as to occupy little space, there is provided, in accordance with the invention, a rack, the individual inverters being removably mountable to the side elements of the rack and said rack having at least one terminal block for receiving cables for current supply. This results in the following: as already explained, the rack serves to accommodate a plurality of inverters, the wiring within the rack being already performed in such a manner that the individual inverters only need to be mounted to the rack and to be connected through their current-carrying cables with the corresponding terminal of the at least one terminal block. Then, the inverters may be associated with individual phases L1 through L3, this only being possible if the individual inverters form what is termed a "cluster".

Other advantageous features of the invention are recited in the dependent claims.

As already explained, the terminal block has terminals for incoming cables from a current source such as a PV plant, and also terminals for cables taking departure from the plurality of inverters. The at least one terminal block is accessible from the outside; the terminal block however is weather-proof covered by a hood or plate shielding the terminal block, meaning that it is protected against driving rain in particular.

According to another feature of the invention, there is provided that the rack of each seat for accommodating an inverter has at least one switch associated therewith for disconnecting the inverter from the DC side. Such a switch, which is accessible from the outside, has the advantage that there is no need to release the current terminals for disconnecting an inverter from a PV plant for example, only the switch needs to be tilted.

More specifically, the rack is configured to be a housing, meaning the housing forms a self-contained unit in the form of a tower which is closed not only at the sides but also at the top and at the bottom so that such a tower may also be utilized outside. The rack is configured to have a square section, it being possible to place such racks in series to increase the number of seats for inverters and to couple them together electrically; the various racks are hereby joined together by a common base plate.

The side walls of the rack are configured to be a booth onto which the inverters are screwed. Screwing is done from the inside so that burglary is made more difficult. The last side wall is then mounted from the outside during assembly. If two such towers are fastened side-by-side to a common base plate, the last inserted side walls are preferably immediately adjacent in order to make burglary more difficult as already explained.

The invention will be explained by way of example herein after with reference to the drawings.

BRIEF DESCRIPTION OF THE DRAWINGS

Figure 1:
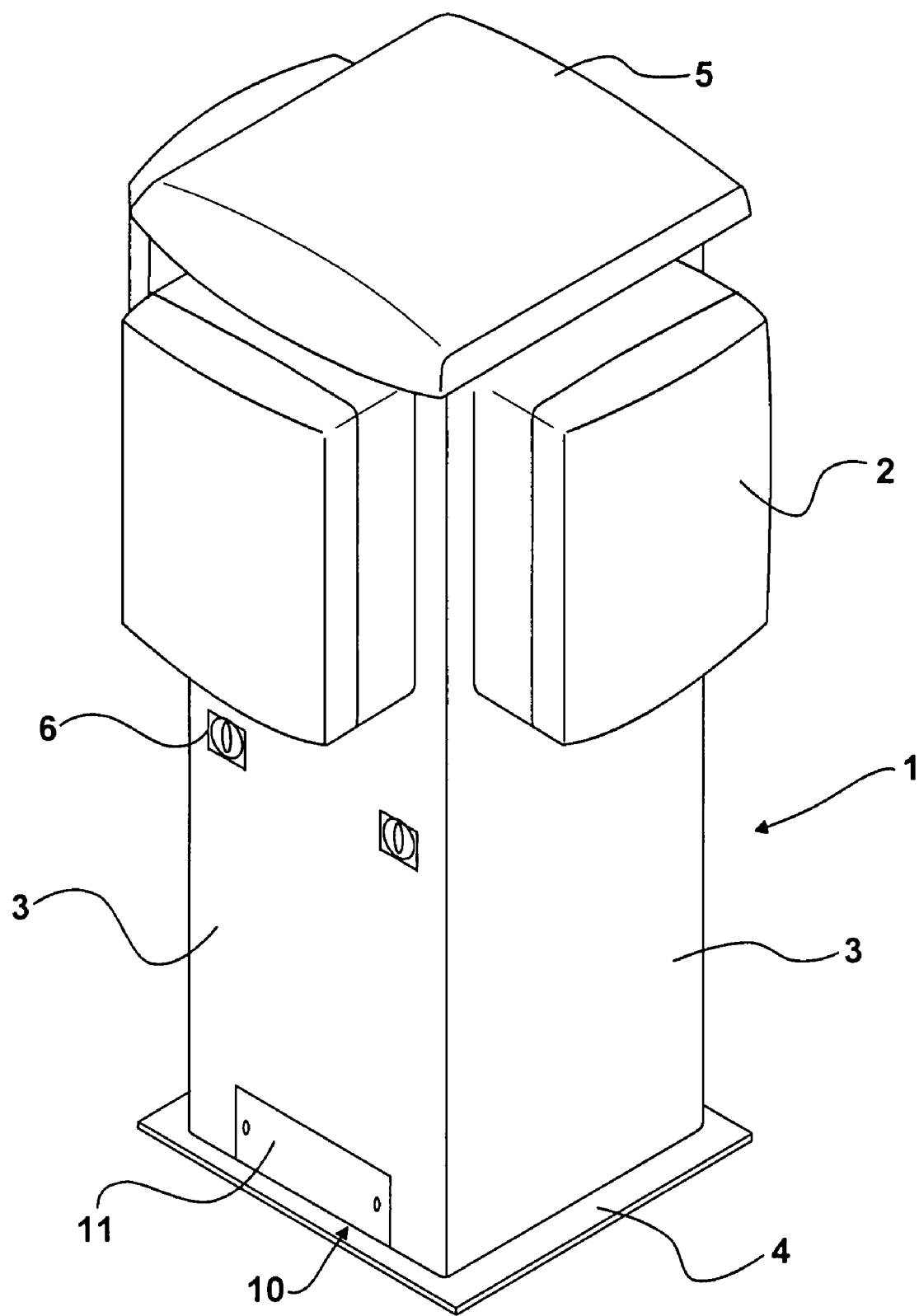
FIG. 1 shows an apparatus for accommodating a plurality of inverters.
Figure 2:
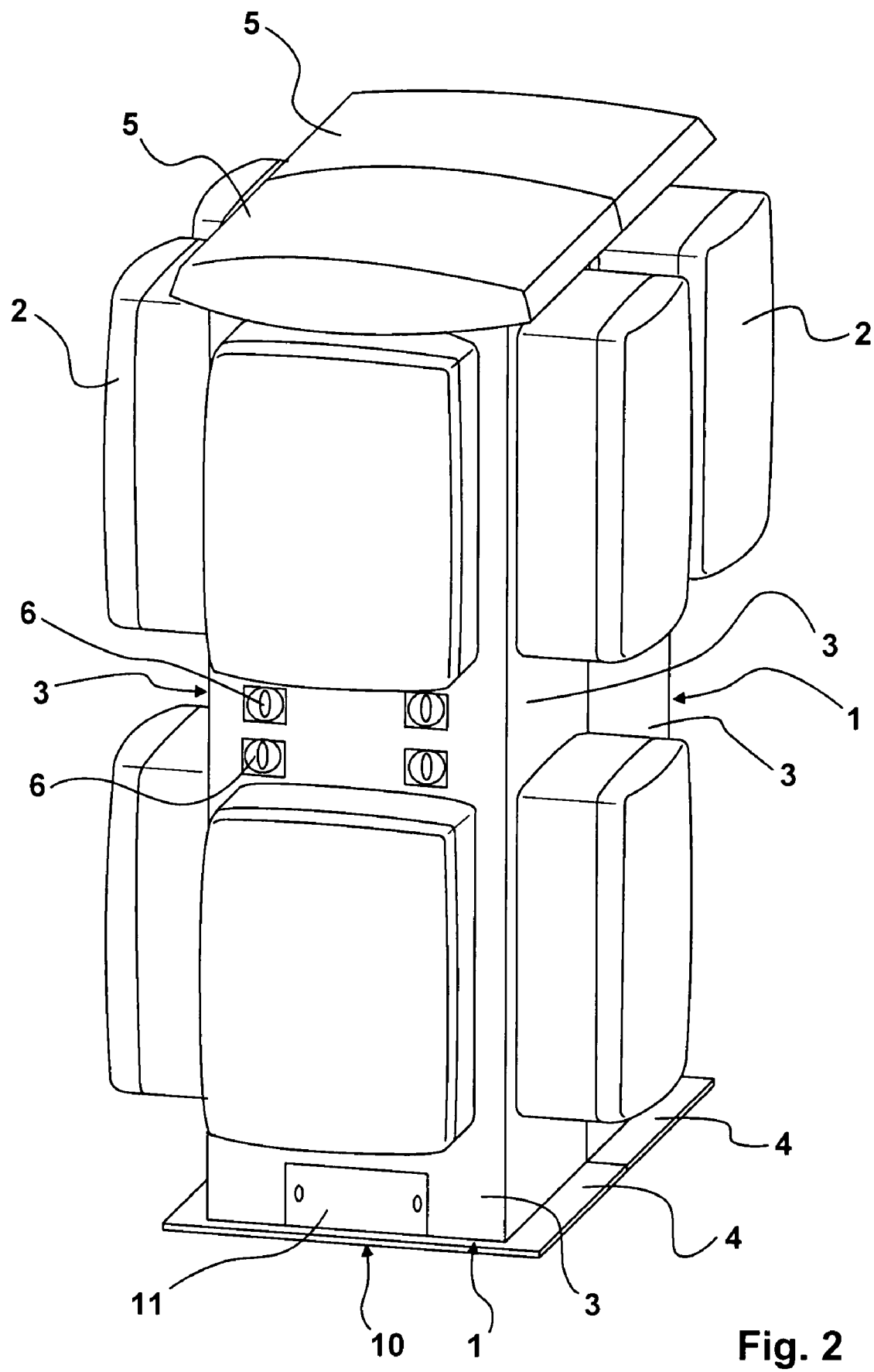
FIG. 2 shows a device of two such apparatus arranged side by side on a common base plate.
Figure 3:
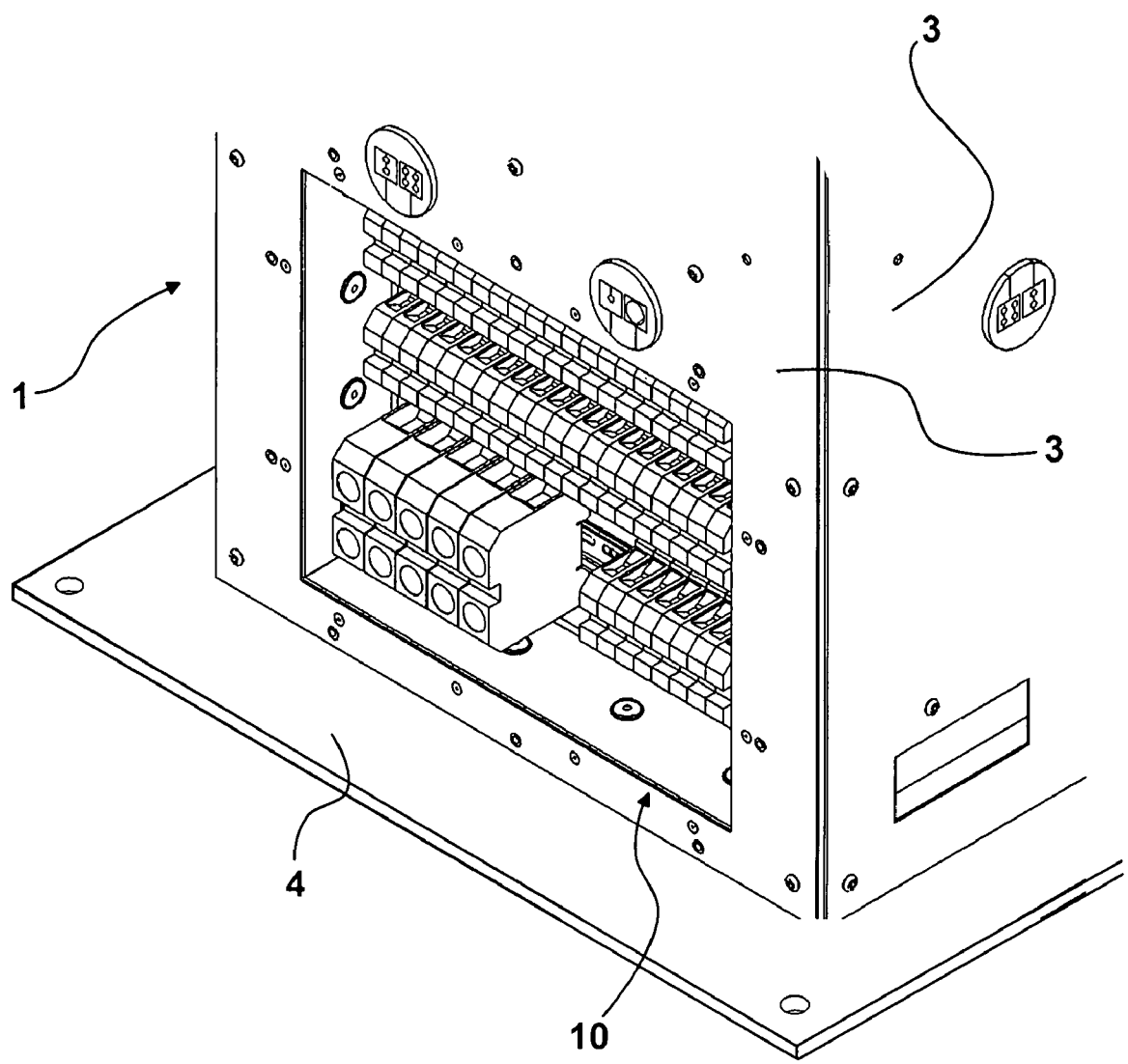
FIG. 3 shows the terminal block to an enlarged scale.

According to the FIGS. 1 and 2, the apparatus for accommodating a plurality of inverters is labeled at 1. The inverters bear the reference numeral 2. It can be seen that the apparatus is configured like a tower and has a square cross section. This shape constitutes the rack and is made from four lateral metal sheets 3 forming, in connection with the base plate 4 and the cover 5, the housing for accommodating the inverters labeled at 2. Each inverter is associated with a switch 6, by means of which each inverter can be disconnected from the DC side.

The invention is also directed to a terminal block 10 having various terminals for clampingly receiving cables (not shown). The terminal block 10 is situated offset within the housing 1 or the tower and is closed by a plate 11 once the inverters 2 have been mounted in order to protect the terminal block against water penetration. The plate is fixed by screws.

According to FIG. 2, there is provided an embodiment in which two such apparatus are disposed side-by-side, with the base plates 4 of the two apparatus being connected.

As already explained herein above, the inverters are screwed from within to the lateral metal sheets 3 so as to make it more difficult to steal the inverters. On the fourth side of the tower there are no inverters, this side wall being fastened from outside. If two such towers are disposed adjacent to each other and proximate to this wall on a respective one of the base plates 4, the access to the inside of each tower for dismounting the inverters is at least made more difficult.

We claim:

1. An apparatus for accommodating a plurality of individual inverters, comprising a rack, the individual inverters being removably mountable to the side elements of said rack, said rack having at least one terminal block for receiving cables for current supply, wherein said at least one terminal block is protected against water penetration.

2. The apparatus as set forth in claim 1 further comprising a removable hood or plate to protect the at least one terminal block against water penetration.

3. The apparatus as set forth in claim 1, wherein the at least one terminal block comprises terminals for incoming cables from a current source.

4. The apparatus as set forth in claim 1, wherein the at least one terminal block comprises terminals for incoming cables suitable for carrying current from a PV plant.

5. The apparatus as set forth in claim 1, wherein the at least one terminal block comprises terminals for cables taking departure from the plurality of inverters.

6. The apparatus as set forth in claim 1, wherein the rack comprises at least one switch associated with each mount for an inverter to disconnect the inverter from the current source.

7. The apparatus as set forth in claim 1 wherein the rack is configured to be a housing.

8. The apparatus as set forth in claim 1, whereby the rack is configured to have a square cross section.

9. The apparatus as set forth in claim 1 wherein the rack comprises well elements in the form of metal sheets.

10. The apparatus as set forth in claim 1 wherein the rack comprises wall elements in the form of metal sheets to which the inverters are screwed.

11. The apparatus as set forth in claim 1 comprising a plurality of racks joined together by a common base plate.

12. The apparatus as set forth in claim 1, wherein two such racks are directly adjacent.

13. An apparatus for accommodating a plurality of individual inverters, comprising a rack, the individual inverters being removably mountable to the side elements of said rack, said rack having at least one terminal block for receiving cables for current supply, said at least one terminal block having terminals for incoming cables suitable for carrying current from a PV plant.

* * * * *